United States Patent [19]

Deckers

[11] Patent Number: 4,636,557
[45] Date of Patent: Jan. 13, 1987

[54] PROCESS FOR THE PREPARATION OF AROMATIC POLYETHERS WITH MIXTURE OF CARBONATE CATALYSTS

[75] Inventor: Hellmuth Deckers, Ingelheim, Fed. Rep. of Germany

[73] Assignee: Hoechst Aktiengesellschaft, Fed. Rep. of Germany

[21] Appl. No.: 673,857

[22] Filed: Nov. 21, 1984

[30] Foreign Application Priority Data

Nov. 24, 1983 [DE] Fed. Rep. of Germany ....... 3342433

[51] Int. Cl.$^4$ .................. C08G 65/38; C08G 65/40
[52] U.S. Cl. .................... 528/126; 528/125; 528/128; 528/174; 528/219
[58] Field of Search ............... 528/125, 126, 128, 174, 528/219

[56] References Cited

U.S. PATENT DOCUMENTS 3,065,205 11/1962 Bonner .
3,332,909 7/1967 Farnham et al. .................. 528/219
3,941,748 3/1976 King ..................................... 528/125
4,108,837 8/1978 Johnson et al. .
4,175,175 11/1979 Johnson et al. .
4,176,222 11/1979 Cinderey et al. .................. 528/174

FOREIGN PATENT DOCUMENTS 847963 7/1970 Canada .
1595710 4/1970 Fed. Rep. of Germany .
1545106 8/1974 Fed. Rep. of Germany .
1276649 6/1972 United Kingdom .

Primary Examiner—Harold D. Anderson
Attorney, Agent, or Firm—Connolly and Hutz

[57] ABSTRACT

The invention relates to a process for the preparation of aromatic polyethers by condensation of the reactants in the presence of a condensation agent consisting of a mixture of metal carbonates comprising (a) lithium and/or an alkaline earth metal carbonate and (b) sodium, potassium, rubidium and/or cesium carbonate.

The combination of carbonates (a) and (b) according to the invention leads to a surprising increase in activity.

8 Claims, No Drawings

PROCESS FOR THE PREPARATION OF AROMATIC POLYETHERS WITH MIXTURE OF CARBONATE CATALYSTS

Aromatic polyethers which also contain, in addition to the ether linkage, other electronegative groups in the main chain are known as a valuable class of high-quality polymers.

They can be prepared by means of an electrophilic polycondensation reaction (Friedel-Crafts reaction) of polynuclear aromatic acid halides (in which at least one aryl radical must carry electron-donating substituents), for example a phenoxyaryl acid chloride, or by the condensation of a diacid halide with an electron-rich aromatic compound, for example a diaryl ether. Such processes are described, for example, in U.S. Pat. No. 3,065,205.

Another possible synthesis is the nucleophilic polycondensation of halogenophenols, the halogen group being activated by electronegative substituents in the ortho or para position, or of mononuclear or polynuclear dihydric phenols with activated dihalogenoaromatic compounds. In the nucleophilic polycondensation, the true agent is the phenate ion formed from the phenol by the action of alkalis. This procedure is described, for example, in German Patent Specification No. 1,545,106 and in Canadian Pat. No. 847,963.

The phenate ions are formed either by reacting the phenol with, for example, alkali metal hydroxides and then removing the water of reaction by azeotropic distillation (German Patent Specification No. 1,545,106) or by adding alkali metal carbonates or bicarbonates to the condensation mixture (Canadian Pat. No. 847,963). In the Canadian Patent, sodium carbonate and potassium carbonate are used in particular as the alkali metal carbonates. By contrast, lithium carbonate is said to have a low reactivity, while rubidium carbonate and cesium carbonate are less preferable for price reasons. Combinations of alkali metal carbonates have also already been used as condensation agents, i.e. in German Patent Specification No. 2,803,873, where a combination of (a large quantity of) sodium carbonate with (a small quantity of) potassium carbonate is used. The total quantity of carbonates in this process is determined so that one to 1.2 mol of alkali metal atoms are present per mol of hydroxyl groups.

However, the literature does not contain any indication of the use of carbonates other than those of the alkali metal group. In fact, when other carbonates are used, only low-molecular products are obtained which give brittle films on compression, as shown in the examples which follow.

Surprisingly, and in no way predictable by those skilled in the art, it has now been found that high-molecular polyethers are obtained by nucleophilic condensation if the condensation agent used is the carbonate of a metal selected from the group comprising lithium or the alkaline earth metals, the activity of the said carbonate by itself being zero or too low, together with a small quantity of the carbonate of an alkali metal selected from the group comprising sodium, potassium, rubidium or cesium, the said quantity by itself being insufficient.

The invention thus relates to a process for the preparation of aromatic polyethers by condensation of the reactants in the presence of metal carbonates as condensation agents, if appropriate in the presence of other additives and if appropriate in the presence of a solvent, wherein the condensation agents used are metal carbonates which represent mixtures of metal carbonates consisting of (a) lithium and/or an alkaline earth metal carbonate and (b) sodium, potassium, rubidium and/or cesium carbonate.

Accordingly, it is an essential feature of the invention to use a mixture of carbonates consisting of one (or more) carbonates from group (a) and one (or more) carbonates from group (b) as the condensation agent. The carbonates in group (a) can also be basic carbonates. Furthermore, it is also possible to use bicarbonates both in group (a) and in group (b).

As the condensation reaction is carried out under substantially anhydrous conditions, in the customary way, the carbonates should preferably also be substantially anhydrous.

Calcium, strontium and barium carbonates are the preferred alkaline earth metal carbonates. Particular preference is given to calcium carbonate (chalk), if appropriate also as mixed calcium/magnesium carbonate (dolomite). Sodium carbonate and potassium carbonate are the preferred carbonates in group (b).

The particle size of the carbonates used according to the invention is not in itself critical, but they are preferably used in a finely ground state and mostly have particle sizes smaller than 0.3 mm. The particle sizes are preferably between 1 and 250 $\mu$m.

The total quantity of carbonate is generally determined so that at least one mol of metal atoms is present per mol of hydroxyl groups. In some cases, it can be advisable to use an excess of up to 20% of carbonate, so that the total quantity of carbonate, according to the invention, is in most cases 1 to 1.2 mol of metal atoms per mol of hydroxyl groups.

The quantity ratio of the carbonate(s) from group (a) to the carbonate(s) from group (b) can vary within wide limits. However, the carbonate (carbonates) from group (a), which by themselves are practically inactive, is (are) a a rule used in excess and combined with a quantity of a carbonate or carbonate mixture from group (b), which quantity by itself would generally be insufficient. This quantity ratio is therefore appropriately 40:60 to 99:1, preferably 80:20 to 95:5.

The expression "aromatic polyethers" is to be understood here as meaning polymers which, in addition to the oxygen atom of the ether linkage, can also contain other atoms and/or groups in the main chain, such as sulfur atoms and/or carbonyl, imino, sulfonyl and/or sulfoxide groups and the like. The polyethers obtainable according to the invention are high-molecular compounds whose relative viscosities (measured in a solution of 0.1 g of the polymer in 100 ml of concentrated sulfuric acid) are generally 1.2 to 5.0, preferably 1.8 to 4.5.

According to the invention, these polyethers are prepared under otherwise customary conditions and by reacting the known reactants (monomers), i.e., for example, by reacting dihydric phenols with activated aromatic dihalogen compounds, or by reacting polynuclear activated halogenophenols in which the halogen is on a different aromatic nucleus from the hydroxyl group, or by reacting halogenophenols of this type with mutually equivalent quantities of dihydric phenols and activated aromatic dihalogen compounds.

In the first of the cases mentioned above, i.e. when reacting dihydric phenols with activated aromatic dihalogen compounds, the molar ratio of the two reactants is normally between 0.9 and 1.1 to 1.0. The compounds are preferably used in a molar ratio of 1:1 or with a small excess of the dihalogen compound.

Possible dihydric phenols are mononuclear diphenols such as hydroquinone and resorcinol, or their homologs such as, for example, methylhydroquinone. Suitable polynuclear dihydric phenols are dihydroxydiphenylalkanes (in particular those which are weakly acidic) or derivatives thereof, which can be prepared by the condensation of oxo compounds with optionally substituted phenols, such as, for example, 2,2-bis(4'-hydroxyphenyl)propane, bis(4-hydroxyphenyl)methane and 2,2-bis(3',5'-dimethyl-4'-hydroxyphenyl)propane.

Other suitable diphenols are those in which two phenol residues are joined together by a direct bond or by atoms or groups such as oxygen, sulfur, carbonyl, sulfonyl, sulfoxide, phenylene, oxyphenyleneoxy or carbonylphenylenecarbonyl. These polynuclear diphenols can be described by the formula

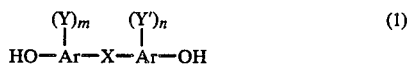

$$\overset{(Y)_m}{\underset{HO-Ar-X-Ar-OH}{|}} \quad \overset{(Y')_n}{\underset{}{|}} \quad (1)$$

in which Ar represents an aryl residue, preferably phenyl, which can be substituted by groups Y and Y'. Y and Y' represent alkyl groups or alkoxy groups each appropriately having 1 to 8 C atoms, preferably 1 to 4 C atoms, aryl or aryloxy groups (aryl preferably being phenyl or naphthyl) or halogen atoms. m and n are integers from 0 to 4 (when Ar=phenylene), or more than 4 (with other aryl residues such as, for example, naphthylene). X is an alkylidene or cycloalkylidene group (in the case of bisphenols prepared from the phenol and an oxo compound such as acetone, formaldehyde, cyclohexanone etc.) or represents, for example, a direct bond,

—O—, —S—, —SO—, —SO$_2$—, —CO—,

—C$_6$H$_4$—,

—O—C$_6$H$_4$—O—,

—CO—C$_6$H$_4$—CO—, etc.

Examples of diphenols of this type are: 2,2-bis(4'-hydroxyphenyl)propane, 2,2-bis(4'-hydroxy-3',5'-dimethylphenyl)propane, bis(4-hydroxyphenyl)methane, bis(4-hydroxyphenyl)cyclohexane, 1,1-bis(4'-hydroxyphenyl)ethane, 2,2-bis(4'-hydroxyphenyl)-1,1,1,3,3,3-hexafluoropropane, 3,3'-dihydroxybiphenyl, 4,4'-dihydroxybiphenyl, 3,4'-dihydroxybiphenyl, 4,4'-dihydroxydiphenyl ether, 4,4'-dihydroxydiphenyl sulfide, 4,4'-dihydroxydiphenyl sulfoxide, 4,4'-dihydroxydiphenyl sulfone, 4,4'-dihydroxybenzophenone, 1,4-bis(4'-hydroxyphenoxy)benzene, 1,3-bis(4'-hydroxyphenoxy)benzene, 1,4-bis(4'-hydroxybenzoyl)benzene, 1,3-bis(4'-hydroxybenzoyl)benzene, 1,4-bis(4'-hydroxybenzenesulfonyl)benzene and 1,3-bis(4'-hydroxybenzenesulfonyl)benzene.

The activated aromatic dihalogen compounds are mononuclear or polynuclear compounds whose halogen atoms are activated by electronegative substituents in the o-position or p-position relative to the halogen atoms. In the case of polynuclear compounds, the halogen atoms are preferably on different benzene nuclei, in which case the electronegative substituents can be the linkage between the benzene nuclei. Suitable dihalogen compounds are described by the formulae

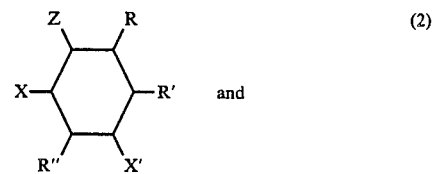

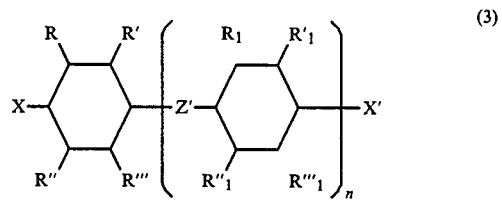

in which R, R', R", R''', R$_1$, R'$_1$, R"$_1$ and R'''$_1$ can be identical or different and can be chosen from the group comprising H, alkyl or alkoxy (each appropriately having 1 to 8 C atoms, preferably 1 to 4 C atoms) and aryl or aryloxy (aryl preferably being phenyl or naphthyl). It is also possible for R and R', R" and R''', and R"$_1$ and R'''$_1$ to denote alkylidene bridges or fused aromatic rings. The compounds substituted only by H atoms are particularly preferred. Z and Z' are respectively monovalent and divalent electronegative substituents, Z' representing, for example, —SO$_2$—, —CO—, —SO—,

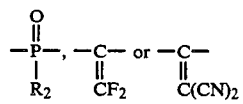

$$-\underset{\underset{R_2}{|}}{\overset{\overset{O}{\|}}{P}}-, \quad -\underset{\underset{CF_2}{\|}}{C}- \text{ or } -\underset{\underset{C(CN)_2}{\|}}{C}-$$

and it being possible for Z to denote a monovalent electronegative group such as —NO$_2$, —NO, —CF$_3$, —CN, Z'-alkyl (alkyl=C$_1$-C$_8$, preferably C$_1$-C$_4$) or —Z'-aryl (aryl preferably being phenyl or naphthyl). R$_2$ represents alkyl (C$_1$-C$_8$, preferably C$_1$-C$_4$) or aryl (preferably phenyl or naphthyl). n is an integer from 1 to 3. For n=1, R' and R$_1$, taken together, can also denote a direct bond, an alkylidene bridge (preferably having 1 to 3 C atoms) or an arylidene bridge, arylidene preferably representing 1,2-phenylene or 1,2- or 2,3-naphthylene. X and X'0 are identical or different and denote halogen atoms, F and Cl being particularly preferred. Examples of suitable dihalogen compounds are: 2,4-dichloronitrobenzene, 2,4-difluoronitrobenzene, 2,4-difluorobenzophenone, 4,4'-dichlorodiphenyl sulfone, 4,4'-difluorodiphenyl sulfone, 4,4'-dichlorobenzophenone, 4,4'-difluorobenzophenone, 4,4'-dichlorodiphenyl sulfoxide, 4,4'-difluorodiphenyl sulfoxide, 1,4-bis(4'-chlorobenzoyl)benzene, 1,4-bis(4'-fluorobenzoyl)benzene, 1,4-bis(4'-chlorobenzenesulfonyl)benzene, 1,4-bis(4'-fluorobenzenesulfonyl)benzene, 4,4'-bis(4"-chlorobenzoyl)benzophenone, 4,4'-bis(4"-fluorobenzoyl)benzophenone, 2,6-bis(4'-fluorobenozyl)naphthalene, 3,6-difluorofluorenone, 3,6-difluorodibenzothiophene S,S-dioxide, bis(4-fluorophenyl)phenylphosphine oxide and 1,1-bis(4'-fluorophenyl)-2,2-dicyanoethylene.

Halogenophenols which can be used according to the invention are dinuclear or polynuclear phenols in which the halogen atom is not on the benzene nucleus substituted by the hydroxyl group and is activated by an electron-attracting group in the ortho or para position. They can be represented by the general formula

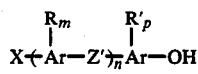 (4)

in which Ar denotes an aryl residue such as benzene or naphthalene and n, m and p are integers from 1 to 4; R and R' can be identical or different and can be selected from the group comprising H, alkyl, aryl, alkoxy or aryloxy. Z' has the same meaning as above. Examples of suitable halogenophenols are: 4-fluoro-4'-hydroxybenzophenone, 4-chloro-4'-hydroxybenzophenone, 4-fluoro-4'-hydroxydiphenyl sulfone, 4-chloro-4'-hydroxydiphenyl sulfone, 1-(4'-hydroxybenzoyl)-4-(4''-chlorobenzoyl)benzene and 1-(4'-hydroxybenzoyl)-4-(4''-fluorobenzoyl)benzene.

The condensation reaction according to the invention is carried out either in the absence of a solvent or in the presence of an inert solvent in which the polymer formed is soluble at the reaction temperature. Examples of possible solvents are: diphenyl sulfone, cyclic aromatic sulfones such as, for example, b,d-dibenzothiophene S,S-dioxide, or, less preferentially, benzophenone and cyclic aromatic ketones such as, for example, fluorenone. Solvents of these types are described inter alia in German Offenlegungsschrift No. 2,803,873.

The lower limit of the reaction temperature is governed by the melting point of at least one of the components or the solvent and the upper limit by the decomposition temperature of the condensation reactants or the solvent (if used). The reaction temperature is generally between 100° and 400° C., preferably between 180° and 350° C., and depends inter alia on the reactivity of the condensation reactants and on the type of solvent (if used). The preferred procedure consists in starting with a low reaction temperature and increasing the temperature gradually or stepwise when the viscosity of the reaction mass increases.

If necessary, the condensation reaction can be carried out in the presence of a chain stopper (regulator). Examples of possible chain stoppers are methyl chloride, t-butyl chloride, 4-chlorodiphenyl sulfone, 4-fluorobenzophenone and the like.

Because of their high heat stability, their resistance to hydrolysis and their other properties, the polymers obtainable according to the invention are suitable inter alia for coverings on electrical cables, for coatings on wires and monofilaments, for moldings in electrical devices, and the like.

In the examples which follow, which, in the case of examples according to the invention, illustrate the present invention in greater detail, the relative viscosity of the polymers obtained were always determined on a solution of 0.1 g of the polymer in 100 ml of concentrated sulfuric acid.

EXAMPLE 1

(comparison)

0.0998 mol (21.8 g) of 4,4'-difluorobenzophenone, 0.1 mol (11.0 g) of hydroquinone, 60 g of diphenyl sulfone and 0.11 mol (15.1 g) of anhydrous potassium carbonate (ground to a particle size of less than 0.3 mm) were introduced into a four-necked flask under nitrogen, 0.0004 mol (0.10 g) of 4-chlorodiphenyl sulfone being added as a regulator, the flask being equipped with an internal thermometer, a gas inlet, a stirrer and an air condenser. The contents of the flask were stirred, in the stream of nitrogen, at 200° C., at 250° C. and at 320° C. for one hour at each temperature. After a reaction time of 10 minutes at 200° C., the mixture became so viscous that 40 g of diphenyl sulfone had to be added. When the reaction had ended, the thick, light beige mass was poured out of the flask onto a PTFE film.

The cooled reaction mixture was comminuted in a mill and washed several times with acetone and water to remove the inorganic constituents and the solvent.

The remaining white polymer powder was dried; it had an ash content (at 600° C.) of less than 0.1% and a fluorine content of 0.01%. The yield was 86%, based on the difluorobenzophenone used. The relative viscosity was 1.64.

EXAMPLE 2

(comparison)

The procedure of Example 1 was followed, but 0.11 mol (11.0 g) of anhydrous calcium carbonate was used in place of the potassium carbonate. After a reaction time of approximately three hours, the reaction mixture in the flask was still very thin. The relative viscosity of the polymer isolated was 1.12.

EXAMPLE 3

The procedure of Example 1 was followed, but 0.1 mol (10.0 g) of anhydrous calcium carbonate and 0.01 mol (1.4 g) of anhydrous potassium carbonate were used in place of the potassium carbonate. Both carbonates had particle sizes of less than 300 μm. The reaction mixture became thick so quickly that, in addition to the 40 g after 10 minutes, it was necessary to add two further 20 g portions (after 95 and 130 minutes) and two 50 g portions (after 135 and 165 minutes) of diphenyl sulfone. The polymer isolated had a relative viscosity of 4.42.

Similar results are obtained if the potassium carbonate is replaced with sodium, rubidium or cesium carbonate.

Likewise, similar results are obtained if the following dihalogen compounds are used in place of the 4,4'-difluorobenzophenone: 4,4'-difluorodiphenyl sulfone, 4,4'-dichlorodiphenyl sulfone, 4,4'-dichlorobenzophenone, 1,4-bis(4'-chlorobenzoyl)benzene, 1,4-bis(4'-fluorobenzoyl)-benzene, 1,4-bis(4'-fluorobenzoyl)diphenyl ether, bis(4-fluorophenyl)phenylphosphine oxide, 2,2-bis(4-fluorophenyl)-1,1-dicyanoethylene, 2,2-bis(4-fluorophenyl)-1,1-difluoroethane and 2,4-dichloronitrobenzene.

Similarly, the hydroquinone can be replaced with the following diphenols: resorcinol, 2-methylhydroquinone, 2,2-bis(4'-hydroxyphenyl)propane, 4,4'-dihydroxybenzophenone, 1,1-bis(4'-hydroxyphenyl)cyclohexane, 4,4'-dihydroxydiphenyl ether, 4,4'-dihydroxybiphenyl, 1,4-bis(4'-hydroxybenzoyl)benzene, 1,4-bis(4'-hydroxybenzoyl)diphenyl ether and 2,2-bis(4'-hydroxyphenyl)-1,1,1,3,3,3-hexafluoropropane.

EXAMPLE 4

The procedure of Example 1 was followed, but a mixture of 0.1 mol (19.7 g) of barium carbonate and 0.01 mol (1.4 g) of potassium carbonate was added in place of the potassium carbonate. After 130 minutes, 50 g of diphenyl sulfone were added because the reaction mixture would otherwise have been too thick. On working-up, the polymer was also washed with dilute hydrochloric acid. The ash and fluorine contents were determined as 0.4% and 0.06%. The relative viscosity of the polymer obtained was 2.04.

EXAMPLE 5

(comparison)

The procedure of Example 4 was followed, but only barium carbonate (0.11 mol) was used. The addition of diphenyl sulfone was superfluous because the reaction mixture always remained thin. The relative viscosity of the polymer, which was measured after working-up, was only 1.13.

EXAMPLE 6

The procedure of Example 4 was followed, but 0.1 mol (14.77 g) of strontium carbonate and 0.01 mol (1.4 g) of potassium carbonate were used. 10 g of diphenyl sulfone were added after 10 minutes, a further 40 g after 80 minutes and a further 50 g after 100 minutes. The polymer yield after working-up was 91%, based on the difluorobenzophenone. The fluorine and ash contents were found to be 0.015% and 0.02%. The relative viscosity of the polymer was 2.01.

EXAMPLE 7

(comparison)

The procedure of Example 5 was followed, but strontium carbonate was used in place of the barium carbonate. The relative viscosity of the polymer was only 1.16.

EXAMPLES 8 AND 9

(comparison)

The procedure of Example 5 was followed, but basic magnesium carbonate and basic zinc carbonate were used in place of the barium carbonate. No polymer could be obtained in either case.

EXAMPLE 10

The procedure of Example 1 was followed, but 1.1 mol (81.3 g) of anhydrous lithium carbonate were used. The viscosity of the reaction mixture did not increase during this process.

After the addition of a small quantity (0.8 g) of potassium carbonate, vigorous foaming of the reaction mixture was observed and, after 150 minutes, 20 g of diphenyl sulfone had to be added because the mass was becoming too thick. The relative viscosity of the polymer obtained was 2.21.

EXAMPLE 11

The procedure of Example 1 was followed, but 0.1 mol (10.01 g) of anhydrous calcium carbonate and 0.01 mol (1.06 g) of anhydrous sodium carbonate were used. This gave a polymer with a relative viscosity of 1.52.

EXAMPLE 12

0.2 mol (43.2 g) of 4-hydroxy-4'-fluorobenzophenone, 0.10 mol of anhydrous calcium carbonate and 0.01 mol of anhydrous potassium carbonate were condensed together with 60 g of diphenyl sulfone as in Example 1. The polymer isolated was light beige and had a relative viscosity of 1.84.

Similar results are obtained if one of the following compounds is used as the halogenophenol in place of the 4-hydroxy-4'-fluorobenzophenone: 4-chloro-4'-hydroxybenzophenone, 4-chloro-4'-hydroxydiphenyl sulfone, 4-fluoro-4'-hydroxydiphenyl sulfone and 1-(4'-hydroxybenzoyl)-4-(4''-fluorobenzoyl)benzene.

EXAMPLE 13

0.8 mol (229.7 g) of dichlorodiphenyl sulfone and 0.8 mol (88.08 g) of hydroquinone were melted at 180° C., under nitrogen, in a three-necked flask equipped with a stirrer, an air condenser and a nitrogen inlet tube. 0.8 mol (80 g) of calcium carbonate and 0.08 mol (11.06 g) of potassium carbonate were added under nitrogen. The reaction mixture became pale yellow. The temperature was then raised to 250° C., whereupon the reaction started and the mass foamed and became very thick.

On heating to 350° C., the stirrer was briefly able to move again; after a few minutes, the mass again became very thick and wrapped around the stirrer. The reaction was then stopped; after grinding of the solid reaction mass and extraction, a light beige polymer (240 g) with a relative viscosity of 1.56 could be isolated.

EXAMPLE 14

The procedure of Example 3 was followed, but a mixture of 4,4'-difluorobenzophenone (0.8 mol) and 4,4'-dichlorodiphenyl sulfone (0.2 mol) was used. The polymer isolated had a relative viscosity of 1.72. According to the NMR spectra, it had structures of

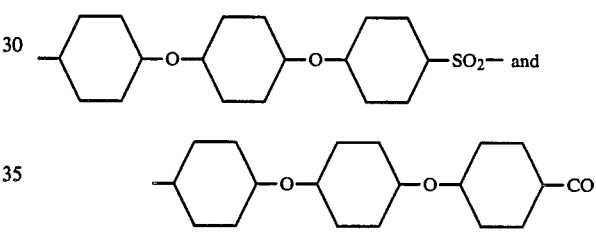

in the ratio of the quantities used, and crystallized from the melt.

What is claimed is:

1. Process of preparing aromatic polyethers which comprises condensing diphenols and activated aromatic dihalogen compounds; polynuclear activated halogenophenols; or polynuclear activated halogenophenols, together with mixtures of dihydric phenols and activated aromatic dihalogen compounds, the molar ratio between diphenol and dihalogen being about 0.9 to 1.1:1
   in the presence of a condensation agent of at least one carbonate selected from the group consisting of lithium and alkaline earth metal carbonate, and
   at least one carbonate selected from the group consisting of sodium, potassium, rubidium and cesium carbonate,
   the condensation agent being in an amount of at least one mol of metal atoms per mol of hydroxyl.

2. The process as claimed in claim 1 wherein the ratio of the carbonate of the group consisting of lithium and alkaline earth carbonate to the carbonate of the group consisting of sodium, potassium, rubidium and cesium carbonates ranges from 40:60 to 99:1.

3. The process as claimed in claim 1 wherein the condensation agent is a mixture of calcium carbonate and a carbonate selected from the group consisting of sodium carbonate and potassium carbonate.

4. The process as claimed in claim 1 wherein the condensation reaction is carried out in the presence of a solvent.

5. The process as claimed in claim 1 wherein said aromatic dihalogen compounds are activated by electron-attracting groups.

6. The process as claimed in claim 1 wherein said polynuclear activated halogenophenols activated by at least one electron-attracting substituent in the ortho or para position have the halogen on a different nucleus from the hydroxyl group.

7. The process as claimed in claim 5, in which equal proportions of said diphenols and said aromatic dihalogen compounds are reacted in the condensation reaction.

8. The process as claimed in claim 1, wherein condensation is conducted in the presence of an additive selected from the group consisting of 4-chlorodiphenyl sulfone or 4-fluorobenzophenone.

* * * * *